No. 769,055. PATENTED AUG. 30, 1904.
G. L. BUMGARDNER.
CULTIVATOR SHOVEL.
APPLICATION FILED NOV. 17, 1903.
NO MODEL.
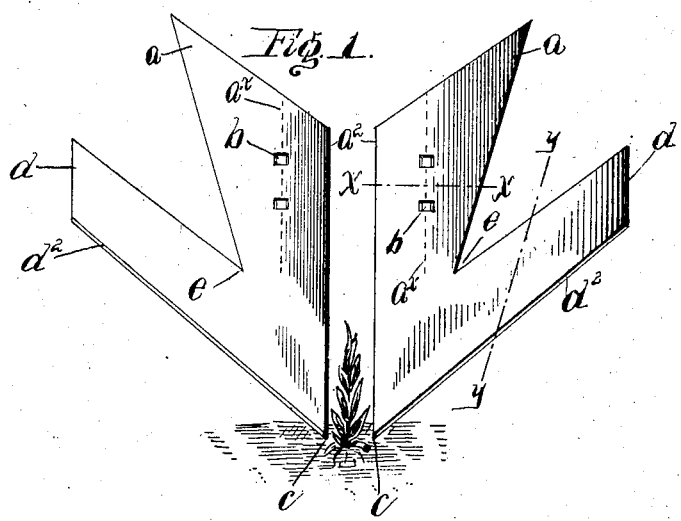
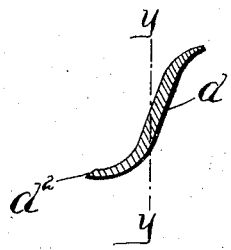
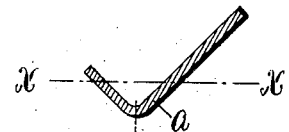
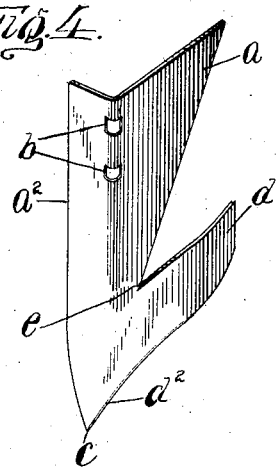
WITNESSES:
Eugene M Hiney
E H Lamy
INVENTOR:
George L. Bumgardner,
by
R. S. Dyrenforth,
his attorney No. 769,055.
Patented August 30, 1904.

UNITED STATES PATENT OFFICE.

GEORGE LINCOLN BUMGARDNER, OF GRIDLEY, KANSAS.

CULTIVATOR-SHOVEL.

SPECIFICATION forming part of Letters Patent No. 769,055, dated August 30, 1904.

Application filed November 17, 1903. Serial No. 181,510. (No model.)

*To all whom it may concern:*

Be it known that I, GEORGE LINCOLN BUMGARDNER, a citizen of the United States, residing at Gridley, in the county of Coffey and State of Kansas, have invented certain new and useful Improvements in Cultivator-Shovels; and I do hereby declare the following to be a full, clear, and exact description of the invention, such as will enable others skilled in the art to which it appertains to make and use the same.

My invention relates to cultivator shovels or teeth, and has for its objects the economical production of a cultivator shovel or tooth which is of light draft, on which weeds and trash do not collect, one which is capable of stirring the soil close to the plant cultivated without covering it with soil and breaking it down, at the same time cutting down undesirable growth at one side of the plant at a distance therefrom and turning such growth with the soil and leaving the same smooth, and one which can be stamped or cut from a strip of metal without waste of material; and my invention consists of the constructions, arrangements, and combinations herein described and claimed.

In the accompanying drawings, forming a part of this application, I have illustrated one form of embodiment of my invention, in which drawings like reference-symbols indicate corresponding parts, and in which—

Figure 1 is a front elevation of a pair of cultivator teeth or shovels of my invention shown on either side of a plant. Fig. 2 is a sectional view on the line $x\,x$ of Fig. 1. Fig. 3 is a sectional view on the line $y\,y$ of Fig. 1, and Fig. 4 is a perspective view of my device.

Referring to the drawings, $a$ is the moldboard, having its upper sides inclined back from the central vertical line $a^\times$, (shown in a dotted line, Fig. 1,) and $b$ openings therein through which bolts or other means suitable to attach same to a shank may be passed. The straight edge thereof, $a^2$, terminates in the point $c$, and is adapted to stir the soil near the roots of the plant cultivated. The share thereof, $d$, is formed into a cutting edge $d^2$, on an angle to said straight edge. Said share is curved or inclined upward and backward from the cutting edge, which in operative position is nearly horizontal.

When the device is moved forward, the edge $d^2$ cuts into soil, and the upwardly-inclined or curved plane of the share carries the weeds and soil upward and passes them through the opening $e$, formed between the share and moldboard, thus preventing clogging and leaving the soil turned over and smooth behind it. The angular shape of the upper portion of the moldboard helps to subserve this function because of its peculiar shape. This angular shape is clearly shown in Figs. 2 and 4.

In the operation of the device it is obvious that the cutting edge $d^2$ of the share will be nearly horizontal and cut the weeds to a distance at one side of the plant cultivated, while the narrow moldboard $a$ affords no point of attachment for weeds and trash, and yet affords a very light draft and throws sufficient soil to the plant. The inclined planes of the moldboard and share throw the soil and weeds through the opening $e$ and leaves the soil turned smooth and also leaves a very shallow furrow. It will also be obvious that the straight edge $a^2$ of the device allows operation very close to the plant without danger of breaking it down, throwing enough soil to it to cultivate the plant properly, and this without the use of fenders or other like devices.

The shovel or tooth of my construction may be stamped out, forged, or formed in any suitable manner; but its peculiar shape allows it to be stamped from a straight strip of metal without waste, as by turning the tops of two points together a parallelogram is formed. It may be used in "gangs" to cultivate a wide space, or two shovels only may be used, or the shovels may be shifted to throw the soil either to or from a plant, as may be required.

Many modifications of my invention may be made without departing from the spirit thereof. Therefore I do not desire to be limited to the exact form herein described and illustrated.

Having thus fully described my invention, what I claim as new, and desire to secure by Letters Patent, is—

A cultivator-shovel comprising a moldboard having its upper sides inclined at an angle backward from a central vertical line, one edge thereof extending downward in a straight line and the other edge thereof at an angle thereto, a share extending from the side of the moldboard, opposite the straight edge, in upward and backward curves and having its lower portion formed into a cutting edge, and means to permit attachment to a cultivator, substantially as described.

In testimony whereof I affix my signature in the presence of two subscribing witnesses.

GEORGE LINCOLN BUMGARDNER.

Witnesses:
ROBT. MITCHELL,
FRANK ST. JOHN.